United States Patent
Engstrom et al.

[11] Patent Number: 6,084,871
[45] Date of Patent: Jul. 4, 2000

[54] METHOD FOR SYNCHRONIZATION OF TRANSMITTER AND RECEIVER AT MOBILE RADIO SYSTEM

[75] Inventors: Bo Engstrom; Mikael Isaksson; Roger Larsson; Sven-Rune Olofsson; Michael Unneback; Goran Oqvist; Christer Ostberg; Lennart Olsson, all of Lulea, Sweden

[73] Assignee: Telia AB, Farsta, Sweden

[21] Appl. No.: 08/836,985

[22] PCT Filed: Nov. 21, 1995

[86] PCT No.: PCT/SE95/01382

§ 371 Date: Aug. 20, 1997

§ 102(e) Date: Aug. 20, 1997

[87] PCT Pub. No.: WO96/17455

PCT Pub. Date: Jun. 6, 1996

[30] Foreign Application Priority Data

Nov. 29, 1994 [SE] Sweden .................................. 9404121

[51] Int. Cl.[7] ................................ H04L 7/08; H04B 7/26
[52] U.S. Cl. .................... 370/350; 370/203; 370/320; 370/335; 370/342; 370/503
[58] Field of Search ..................... 370/203, 210, 370/335, 342, 320, 336, 347, 350, 503, 491, 500; 375/200

[56] References Cited

U.S. PATENT DOCUMENTS

| | | | |
|---|---|---|---|
| 4,129,755 | 12/1978 | Murakami | 370/350 |
| 4,502,137 | 2/1985 | Tan | 370/503 |
| 4,534,026 | 8/1985 | Martinez et al. | 370/503 |
| 5,299,235 | 3/1994 | Larsson et al. | 375/114 |
| 5,327,581 | 7/1994 | Goldberg | 370/350 |
| 5,491,718 | 2/1996 | Gould et al. | 375/205 |
| 5,513,184 | 4/1996 | Vannucci | 370/350 |
| 5,517,499 | 5/1996 | Gauffin et al. | 370/503 |
| 5,533,028 | 7/1996 | Hita De La Torre et al. | 370/350 |
| 5,539,730 | 7/1996 | Dent | 370/29 |
| 5,606,560 | 2/1997 | Malek et al. | 370/347 |
| 5,640,414 | 6/1997 | Blakeney, II et al. | 375/200 |
| 5,652,772 | 7/1997 | Isaksson et al. | 375/367 |

*Primary Examiner*—Huy D. Vu
*Assistant Examiner*—Dung Trinh
*Attorney, Agent, or Firm*—Oblon, Spivak, McClelland, Maier & Neustadt, P.C.

[57] ABSTRACT

A method of a mobile radio system for synchronization a transmitter and receiver. The system relates to MC/DS-CDMA-system. In the system information is transmitted digitally in frames. For that purpose a data channel, a pilot channel and a synchronization channel are created. In the data channel the data blocks D0, D1, D2 etc are separated by a guard space Δ. In the pilot channel, respective the synchronization channel, the information is arranged in blocks which are synchronous with each other. The repeating distance, A, of the pilot channel, corresponds to the length of one of the data blocks D0, D1, D2 etc. The repeating distance for the synchronization channel is S, corresponding to a number of blocks in the data channel. In the synchronization channel information is introduced into the blocks which indicates their relation to the data channel. The method in this way allows an identification of the position of the pilot channel, which indicates the position of the synchronization channel, at which a decoding of the information of the the synchronization channel appoints the position of the data channel.

16 Claims, 1 Drawing Sheet

6,084,871

METHOD FOR SYNCHRONIZATION OF TRANSMITTER AND RECEIVER AT MOBILE RADIO SYSTEM

TECHNICAL FIELD

The present invention relates to synchronization of MC/DS-CDMA-systems. The invention accordingly relates to mobile radio systems for multicarrier/direct sequence code divided multiple access, MC/DS-CDMA. The technology is a combination of OFDM, orthogonal frequency division multiplexing, and traditional DS-CDMA, direct sequence CDMA.

PRIOR ART

It is previously known to transmit information in a data channel where the digital information is divided into a number of different blocks. The blocks are separated by guard spaces. The task of the guard spaces is to deal with the time dispersion on the channel. Further, it is known to arrange a pilot channel with the same block division and guard spaces as the data channel. Transmission units transmits a cyclic pilot sequence which is unique within the range possible to listen in to.

A base station always transmits a unique pilot sequence. This causes that a recently turned on mobile station identifies the base station/stations which are located within the range possible to listen in to. A mobile station transmits one of two different types of pilot sequences. A so called random access sequence is transmitted when a mobile station wants to make a connection to a base station. By the random access sequence being used only for this purpose, and being unique for each mobile station, the base station knows that a mobile station wants to establish a connection to it. The other type of pilot sequence the mobile station transmits during an established connection. The mobile station has been given both uplink sequences from the base station.

In the German patent document DE 3401727 is described a TDM-system for transmission of digital information which uses a synchronization channel. The synchronization channel also can contain other information, as for instance information about other performing channels.

In the European patent document EP 606941 is described a device for synchronization of a local oscillator in a OFDM-system.

The document WO 92-5646 describes reception of OFDM-signals. To achieve synchronization, a multiplication with the complex conjugate of a known reference is performed.

In the document WO 92-16063 is described reception and synchronization in an OFDM-system. According to the document, reference symbols are placed at least one carrier from the edge of the frequency raster, and at least two carriers from other reference symbols.

The European document EP 218966 describes a TDMA-system intended for radio transmission. To achieve a synchronization as good as possible, a special signal is introduced into each free time slot.

DESCRIPTION OF THE INVENTION

Technical Problem

At transmission of packet switched digital signals between a transmitting and a receiving equipment in a communications system it is necessary to have the possibility to synchronize the signal transmission to obtain usable information in the receiving equipment. For the message transport between the transmitter and the receiver a number of access methods have been developed, of which MC/DS-CDMA is one. The method is a combination of OFDM and traditional DS-CDMA.

In an OFDM-system the pilot frequencies often become long, for instance N=512 och 1024. Such long correlations are possible but very voluminous to implement by means of digital hardware for falting. Since one in an OFDM-system always has the signals available both in the time and frequence plane, it is attractive to implement the correlation by means of multiplication in the frequency plane. At that, one exchanges a process which demands N*N complex multiplications per frame for another which demands N complex multiplications per frame. This is, however, not easy to perform since the OFDM-system operates with guard spaces ($\Delta$). The Fouriertransform of the data channel is performed with the block length N. If the pilot channel is synchronous with the data channel, the pilot channel is cyclic with the repeating distance N+$\Delta$. In order to perform the correlation in the frequency plane, one has to use a block length which is equal to the repeating distance. With this arrangement one cannot, accordingly, use the same block of data for the Fouriertransforms, and the method is consequently not usable.

It is, accordingly, desirable to find methods where the same block length can be used both in the data channel and in the pilot channel. The present invention is intended to solve the above indicated problem.

The Solution

The present invention relates to a method for synchronization of MC/DS-CDMA-systems. The information is transmitted in a data channel in blocks which are separated by guard spaces. In a second channel are arranged blocks which follow each other successively without guard spaces between the blocks. The blocks in the second channel are placed in relation to the blocks in the data channel, at which the relation between the blocks appoints the position of the data channel, and synchronization of the receiver and the transmitter is achieved.

The invention accordingly relates to a system where transmitter and receiver at mobile radio system transmits information digitally in frames. A number of frames form a block, and different blocks in the data channel are separated by guard spaces. At least a second channel is created. The information in the second channel is divided into blocks, and the blocks are arranged in direct sequence after each other without guard spaces between the blocks. The blocks in the at least second channel are displaced in relation to the blocks in the data channel. A block in the second channel is viewed in relation to blocks in the data channel, at which the relation of the blocks to each other identifies the position of the data channel, at which synchronization of the receiver and the transmitter is achieved.

The information in the at least second channel is cyclic. The blocks in the data channel and in the at least second channel have the same lenght. The cycle in the second channel corresponds to a certain number of blocks in the data channel. At least the second channel comprises a synchronization channel and a pilot channel. Blocks in the synchronization channel are arranged in cyclic sequence. The cycle for the blocks in the synchronization channel is given the same length as a certain number of blocks in the data channel.

Information in the blocks in the synchronization channel indicates the relation of the block to the data channel. Decoding of the information in the synchronization channel indicates the position of the data channel. The blocks of the pilot channel are arranged after each other without guard spaces between the blocks. The blocks of the pilot channel are synchronized with the blocks in the synchronization channel.

The blocks of the pilot channel are cyclically repeated with a period corresponding to the length of a block in the data channel. The position of the pilot channel indicates the position of the synchronization channel. The same blocks and data are used for decoding of information and synchronization, which is made possible by the lenght of the blocks in the data channel and the pilot channel being given the same length.

The system is an MC/DS-CDMA-system.

The invention consequently relates to a method at mobile radio system for synchronization of transmitter and receiver. The system relates to an MC/DS-CDMA-system. In the system, information is transmitted digitally in frames, and a data channel, a pilot channel and a synchronization channel are created. In the data channel the data blocks D0, D1, D2 etc, are separated by guard spaces Δ. In the pilot-respective synchronization channel the information is arranged in synchronous blocks. The repeating distance of the pilot channel, A, corresponds to the length of one of the data blocks D0, D1, D2 etc. The repeating distance of the synchronization channel, S, corresponds to a number of blocks in the data channel. In the synchronization channel, information is introduced into the blocks and indicates their relation to the data channel. Identification of the position of the pilot channel indicates the position of the data channel, and the information in the synchronization channel indicates the position of the data channel.

Advantages

The present invention allows that correlation by means of multiplication in the frequency plane can be performed with N complex multiplications per frame. This should be compared with N*N complex multiplications which in other cases would be required.

The Fouriertransform is performed on data channel and pilot channel on blocks of the same lenght. In the normal case the Fouriertransform had to be performed on different lengths of blocks in the data channel respective for the pilot channel.

Further one utilizes the same blocks of data for Fourier-transform on the channels.

The synchronization channel indicates a relative relationship to the frames in the data channel. This is utilized for appointing where in the data channel one is at present.

The pilot channel indicates the position of the synchronization channel. Furthermore the same data are used for information decoding and synchronization.

PREFERRED EMBODIMENT

Figure 3:
FIG. 3 shows in principle a base station, BS, and a mobile station, MS.

In the following the invention is described with reference to the figures and the designations therein. In a mobile radio system according to FIG. 3 base stations, BS, are arranged. The mentioned base stations communicate with mobile stations, MS. The information is digitally transmitted in frames.

MC/DS-CDMA means Multi Carrier/Direct Sequence Code Divided Multiple Access. The technology is a combination of OFDM, Orthogonal Frequency Division Multiplexing, and traditional DS-CDMA (Direct Sequence CDMA). The principle for MC/DS-CDMA is based on the information being divided into frames. The transmitted time discrete signal sk(i) for the frame k with the length T, and with N sample, can be described as:

$$S_k(i) = a_0 \sum_{n=0}^{\frac{N-1}{M}-1} c_n e^{-j2\pi \xi_k(f_n)t_i} \ldots + a_{M-1} \sum_{\frac{N-1}{M}(M-1)}^{\frac{N-1}{M}M-1} c_n e^{-j2\pi \xi_k(f_n)t_i} + 0 \sum_{n=N-1}^{N-1} e^{-j2\pi \xi_k(f_n)t_i}$$

Where i=(N-Δ), ... (N-1), 0, ... (N-1)

A frame Fk is then represented by:

$$F_k = [S_k(N-\Delta), \ldots S_k(N-1), S_k(0), \ldots S_k(N-1)]$$

Δ constitutes the so called guard space which aims at managing the time dispersion on the channel. For making it possible to perform an FFT, then N=$2^p$, where p is an integer. The number of symbols which are transmitted per frame is indicated by M. The relation between the total number of subcarriers N and the number of subcarriers which each symbol is spread out over (the distribution factor) R, is then indicated by:

$$MR=N-l$$

N−l is the number of subcarriers which in a frame are active, i.e. carriers of information. Consequently then the number of inactive subcarriers is l (lower-case letter L). $c_n$ is the distribution sequence by which every symbol is distributed. This can be repetitive over each symbol or have the same length as the frame. The function $\zeta_k(f_n)$ performs the interleaving in the frequency plane according to suitably chosen algorithm. The combination between the last sum in the formula and $\zeta_k(f_n)$ accounts for the shaping of the spectra with a necessary pass band beside the active subcarriers in order to, after that, to be able to filter away Nyquist-copies.

The technology is intended to be used in a cellular system for mobile radio communication with full duplex, where the connection from the stationary unit (the Base station, BS) to the mobile unit (the mobile station, MS) is denominated as the downlink. The reverse direction is called the uplink.

Figure 1:
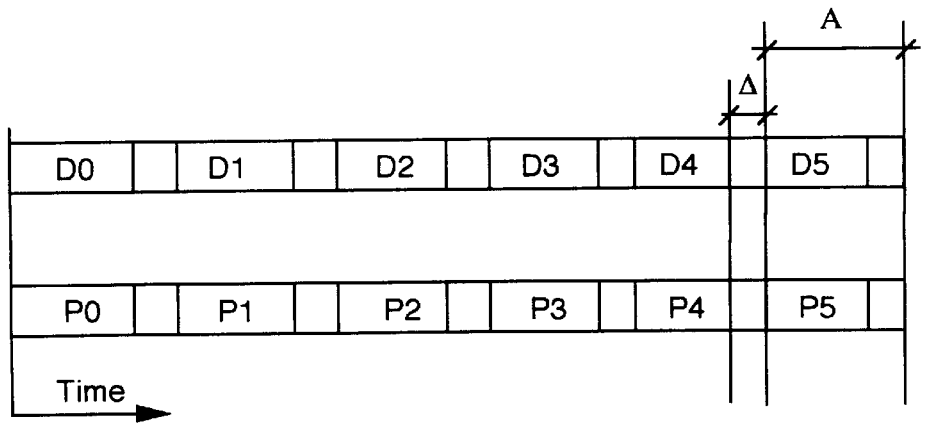
FIG. 1 shows block division for a data channel with the blocks D1, D2, D3 etc, separated by a guard space Δ.

The synchronization method is based upon that each uplink or downlink consists of at least two coded, physical channels. These are called data channel and pilot channel according to FIG. 1. Each transmitting unit, base station or mobile station, transmits a cyclic pilot sequence which is unique within the area which is possible to listen in to.

In the data channel blocks are called D0, D1, D2 etc, separated by guard spaces Δ. Further a pilot channel is arranged with the blocks P0 where guard space A between the blocks is lacking.

A base station always transmits a unique pilot sequence. This makes that a recently turned on mobile station identifies the base station/stations which are within the covered range. A mobile station transmits one of two different types of pilot sequences. A so called random access sequence is transmitted from a mobile station which wants to make a connection to a base station. By the random access sequence being used for only this purpose, and being unique for each base station, the base station knows that a mobile station wants to get into contact with it. The other type of pilot sequence is transmitted from the mobile station during an established connection. The sequence is unique for each transmitting mobile station. Both uplink sequences have the mobile station been given by the base station. Allocation of the uplink sequence is performed according to methods which are well known for persons with expert knowledge in the field.

To be able to find a pilot sequence, and also after that to be able to use the sequence for synchronization in time and frequency and for channel estimation as well, one has to perform correlations in the receiver. In an OFDM-system the pilot sequences become long, for instance 512 or 1024. Such long correlations are possible but voluminous to implement by means of digital hardware for falting. Since one in an OFDM-system always has the signals available both in the time and frequency plane, it is desirable to implement the correlation by means of multiplication in the frequency plane. In this case one exchanges a process which requires N*N complex multiplications per frame for another with N complex multiplications per frame. To perform this in an OFDM-system is, however, not simple whith guard spaces being used. The Fouriertransform of the data channel is performed with a block lenght N. If the pilot channel is synchronous with the data channel, the pilot channel is cyclic and the repeating distance is N+Δ. In order to perform correlations in the frequency plane one has to use a block length which is equal to the repeating distance. The arrangement consequently does not allow that one uses the same block of data for the Fouriertransforms and the method is therefore not practically usable.

Figure 2:
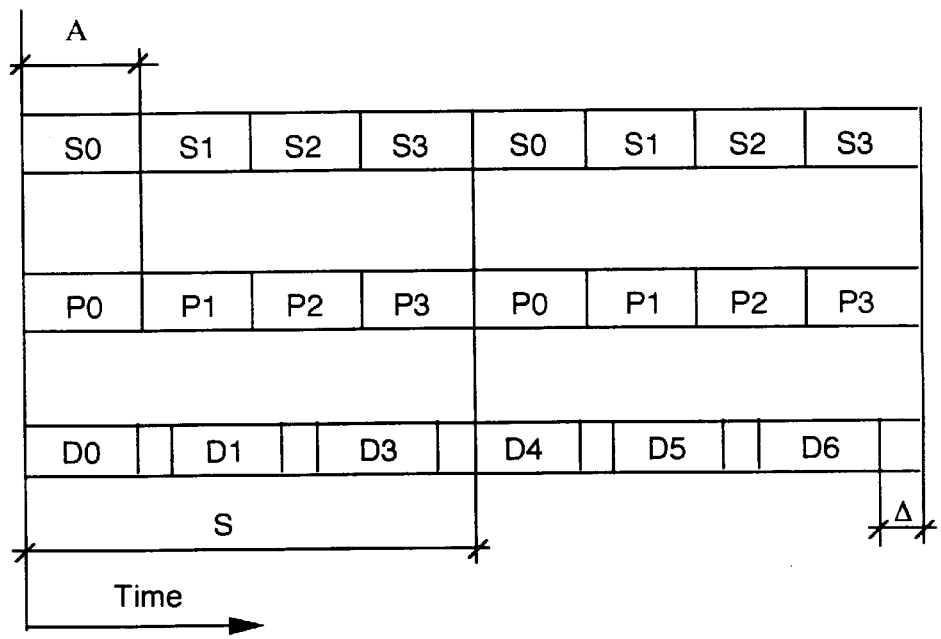
FIG. 2 shows a data channel with the blocks D0, D1, D2 etc, separated by guard space Δ. Further is shown a pilot channel, with the blocks P0, which are directly following each other. In addition there is in the figure shown a synchronization channel with the blocks S0, S1, S2 etc.

The fundamental idea of the invention is shown in FIG. 2. In this case the pilot channel is repeated with repeating distance N without any guard space Δ being added. The position of the pilot channel in relation to the data channel is at that changed from frame to frame. In the figure this is evident from the fact that the pilot channels P0 get different positions in relation to the data channel D0, D1, D2 etc. Further is introduced a synchronization channel where the frames are modulated and among other things marked with the relative position of the frame in relation to the frames in the data channel. In the figure the synchronization frames are designated S0, S1, S2 etc. The synchronization channel is synchronous with the pilot channel. By identifying the position of the pilot channel the position of the synchronization channel is also identifiable. The information of the synchronization channel is decoded, at which the position of the data channel is identifiable. By the repeating distance of the pilot channel being equal to the block lenght of the data channel, the same block of data is usable for information decoding and synchronization.

The invention is not restricted to the above described or to the patent claims, but may be subjected to modifications within the frame of the patent idea.

What is claimed is:

1. A method for synchronizing a transmitter and a receiver in mobile radio systems, comprising steps of:

creating a data channel configured to convey data in a digital format from the transmitter to the receiver, including
dividing the data into frames,
grouping the frames into data blocks, each of the data blocks having a predetermined length, and
inserting a guard space after each of the data blocks;

creating another channel with other blocks, each of the other blocks having a predetermined displacement in position with respect to each of the data blocks, the other blocks being arranged in direct sequence after each other, without guard spaces therebetween; and identifying the predetermined displacement in position of the other blocks with respect to the data blocks so as to synchronize the receiver with the transmitter.

2. The method of claim 1, wherein the step of creating another channel comprises creating the other blocks with a length being the same as the predetermined length of the data blocks.

3. The method of claim 2, further comprising:
decoding the information in the data blocks that were used in the identifying step.

4. The method of claim 1, wherein the step of creating another channel comprises cyclically repeating a sequence of the other blocks with a predetermined period.

5. The method of claim 4, wherein the step of cyclically repeating comprises repeating the sequence at the predetermined period, which corresponds in length to an integer multiple of a composite length of the predetermined length of the data block and the guard space.

6. The method of claim 4, further comprising a step of correlating the sequence of the other blocks with the data blocks, by multiplying in the frequency plane.

7. The method of claim 1, further comprising:
creating a synchronization channel with synchronization blocks, the synchronization blocks being arranged in direct sequence without guard spaces therebetween, wherein the another channel being a pilot channel.

8. The method of claim 7, further comprising:
creating at least one of the length of the other blocks and a length of the synchronization blocks to be a same length as the predetermined length of the data blocks.

9. The method of claim 7, further comprising:
cyclically repeating a sequence of at least one of the other blocks and the synchronization blocks with a predetermined period.

10. The method of claim 9, wherein the step of cyclically repeating comprises repeating the sequence of at least one of the other blocks and the synchronization blocks at the predetermined period, which corresponds in length to an integer multiple of a composite length of the predetermined length of the data block and the guard space.

11. The method of claim 9, further comprising a step of correlating the sequence of the other blocks with the data blocks, by multiplying in the frequency plane.

12. The method of claim 7, wherein the step of creating a synchronization channel comprises including position information in the synchronization blocks for identifying the predetermined displacement of the position of the synchronization blocks with respect to the data blocks.

13. The method of claim 12, wherein the step of identifying the predetermined displacement of the position of the data blocks includes decoding the position information in the synchronization blocks.

14. The method of claim 7, further comprising:
synchronizing the other blocks with the synchronization blocks.

15. The method of claim 7, further comprising:
positioning the other blocks in the another channel to identify the position of the synchronization blocks in the synchronization channel.

16. The method of claim 1, wherein the step of creating a data channel includes creating the data channel as a code division multiple access channel in a multicarrier/direct sequence code division multiple access system.

* * * * *